March 27, 1945.   W. L. IRVINE   2,372,578
BUNDLE SEALING MACHINE
Filed March 24, 1941   9 Sheets-Sheet 1

INVENTOR
William L. Irvine
BY
ATTORNEYS

March 27, 1945.  W. L. IRVINE  2,372,578
BUNDLE SEALING MACHINE
Filed March 24, 1941  9 Sheets-Sheet 2
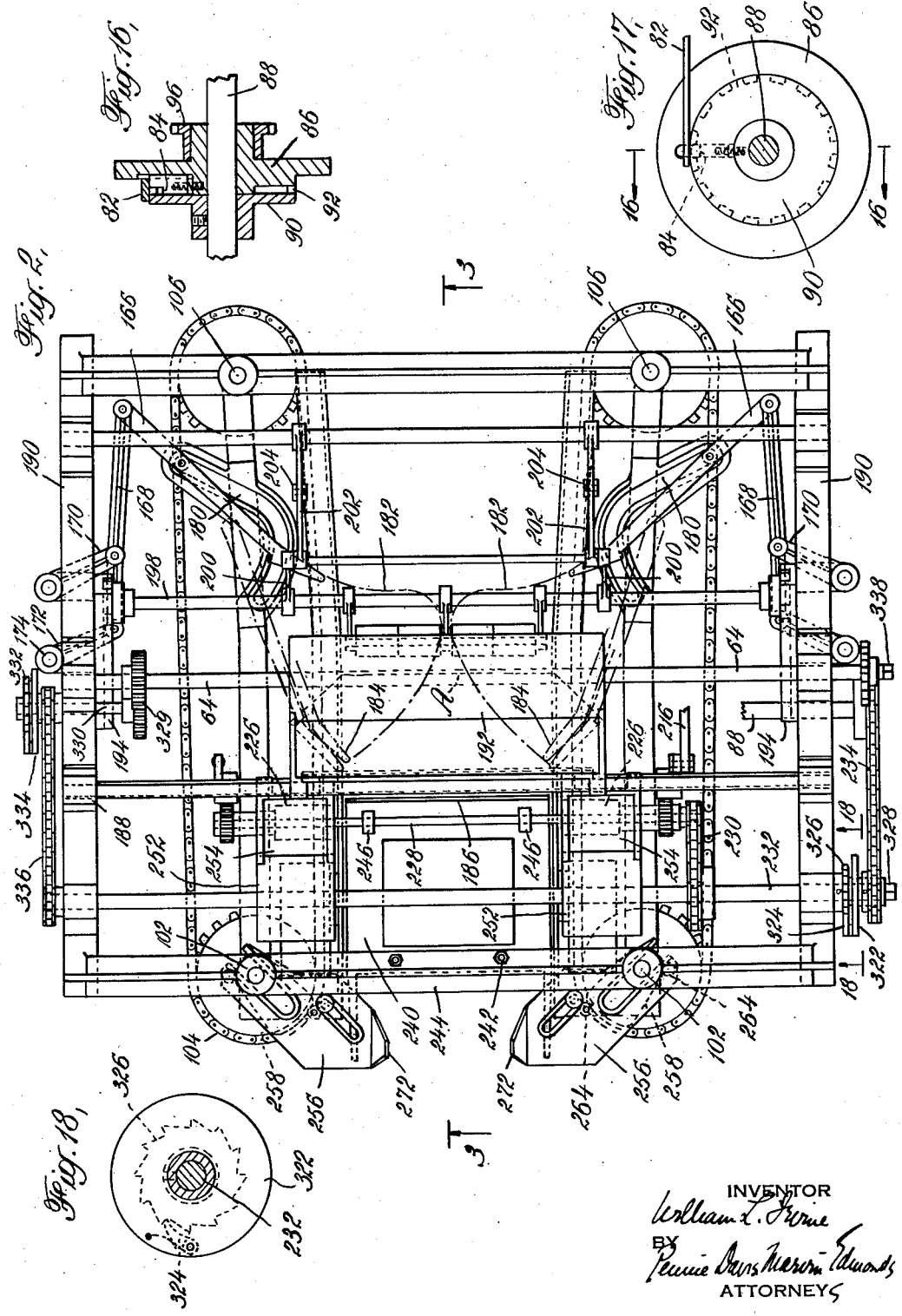
INVENTOR
William L. Irvine
BY
Pennie Davis Marvin Edmonds
ATTORNEYS March 27, 1945.    W. L. IRVINE    2,372,578
BUNDLE SEALING MACHINE
Filed March 24, 1941    9 Sheets-Sheet 3
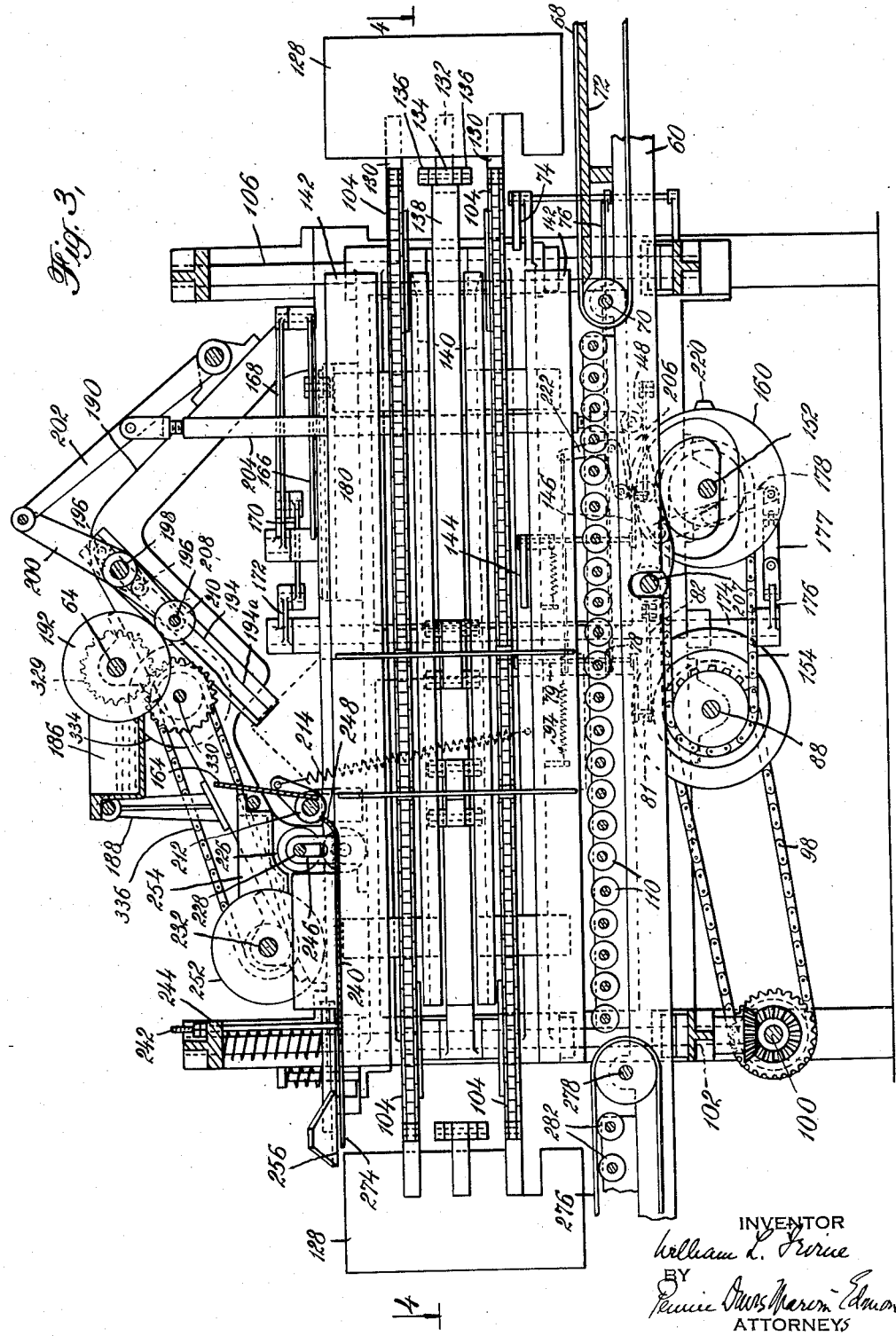
INVENTOR
William L. Irvine
BY
ATTORNEYS

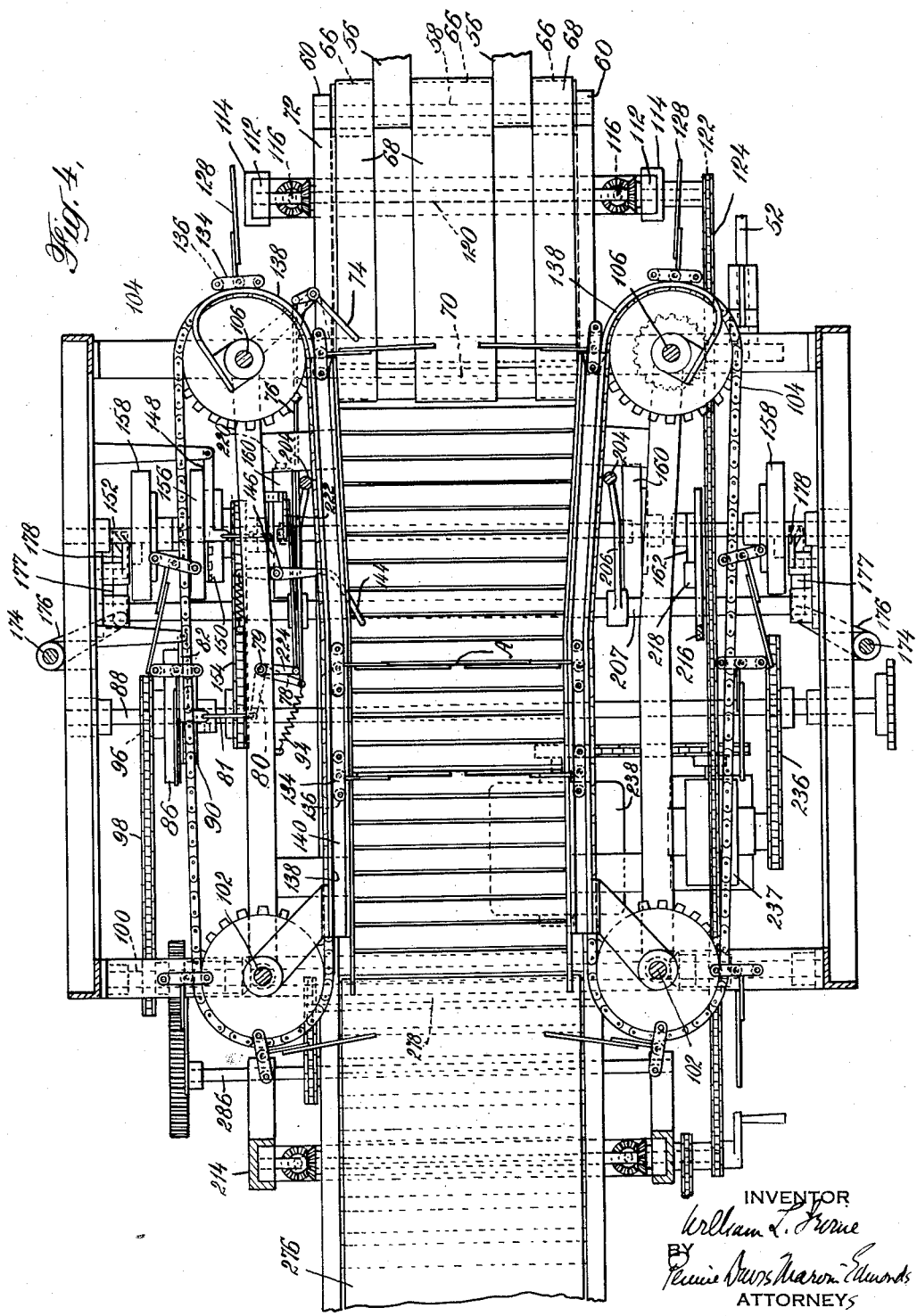

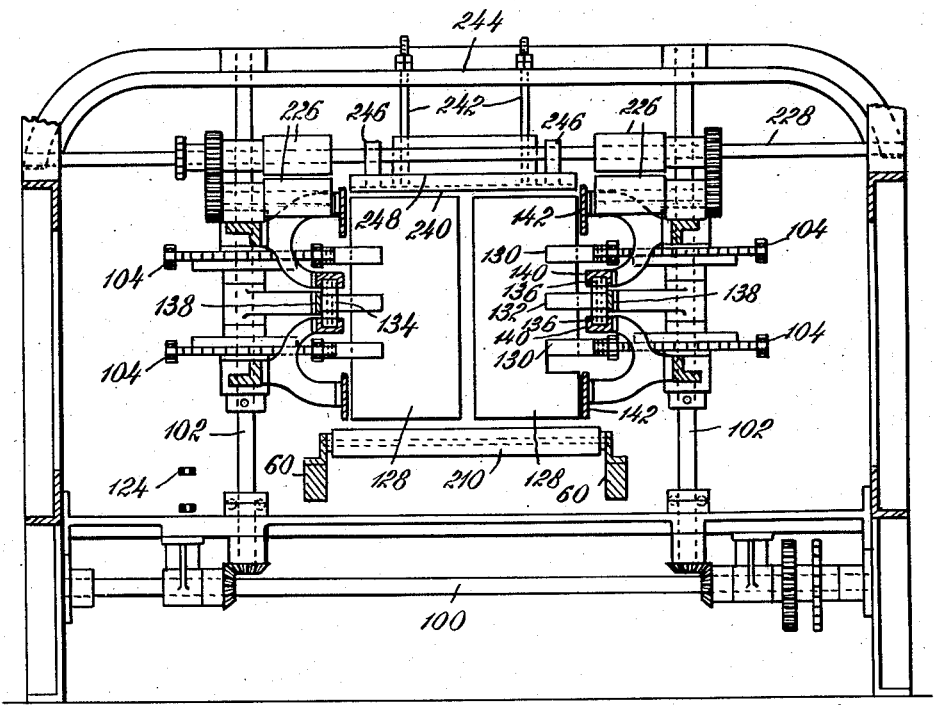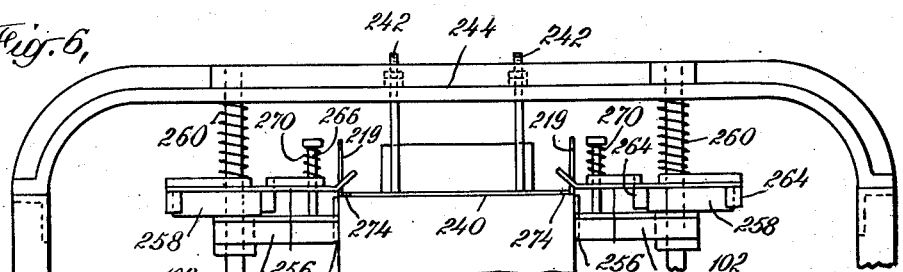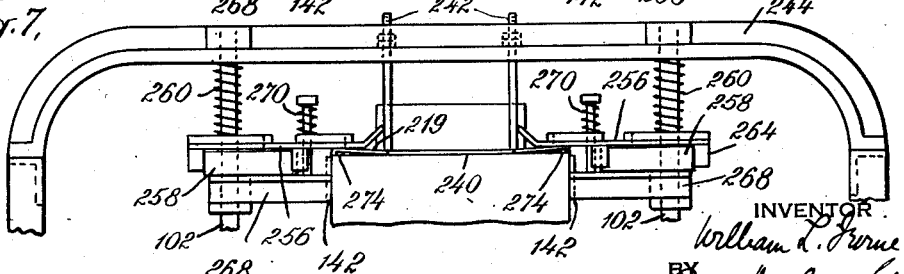

March 27, 1945.  W. L. IRVINE  2,372,578
BUNDLE SEALING MACHINE
Filed March 24, 1941  9 Sheets-Sheet 6
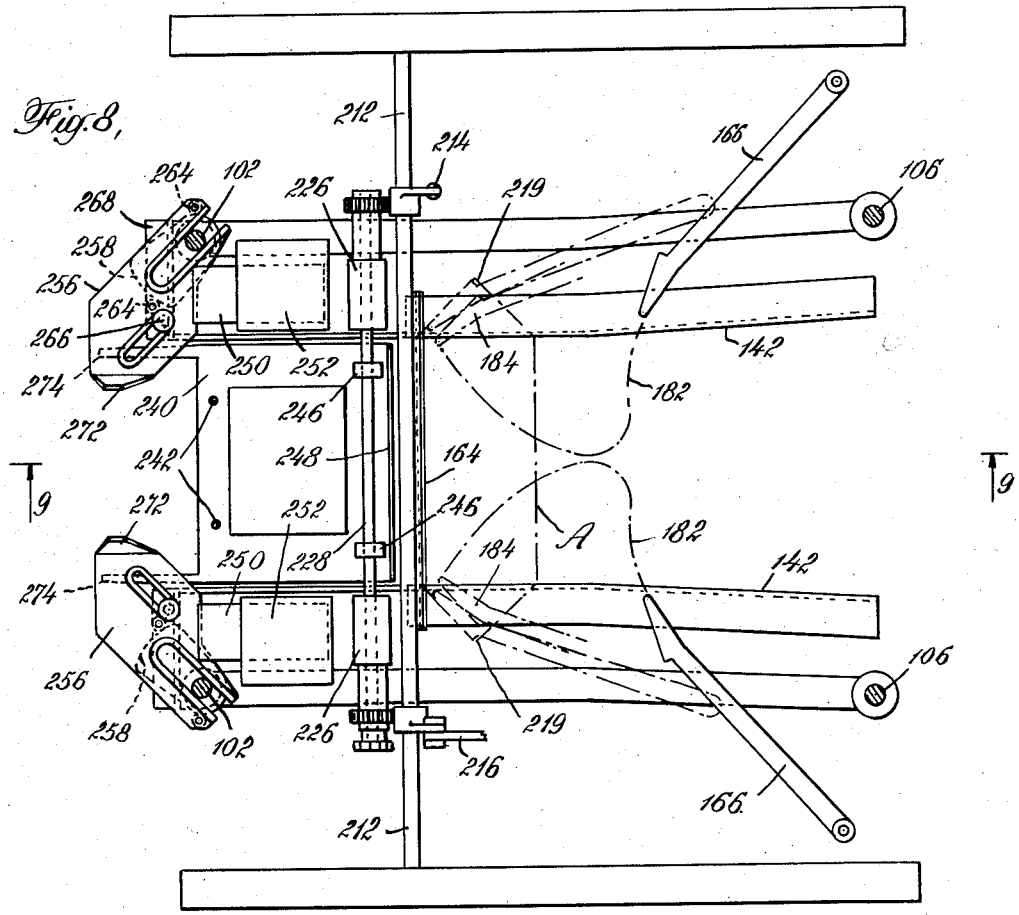
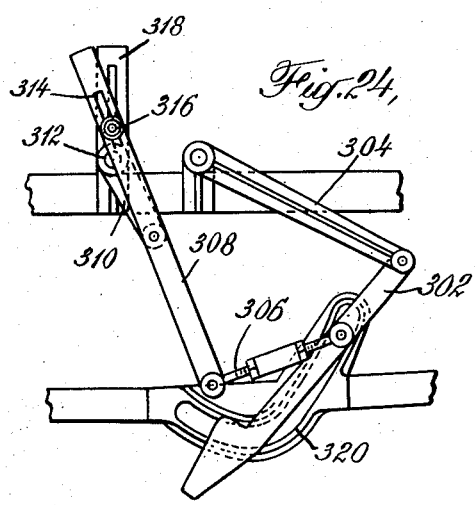
INVENTOR
William L. Irvine
BY
ATTORNEYS

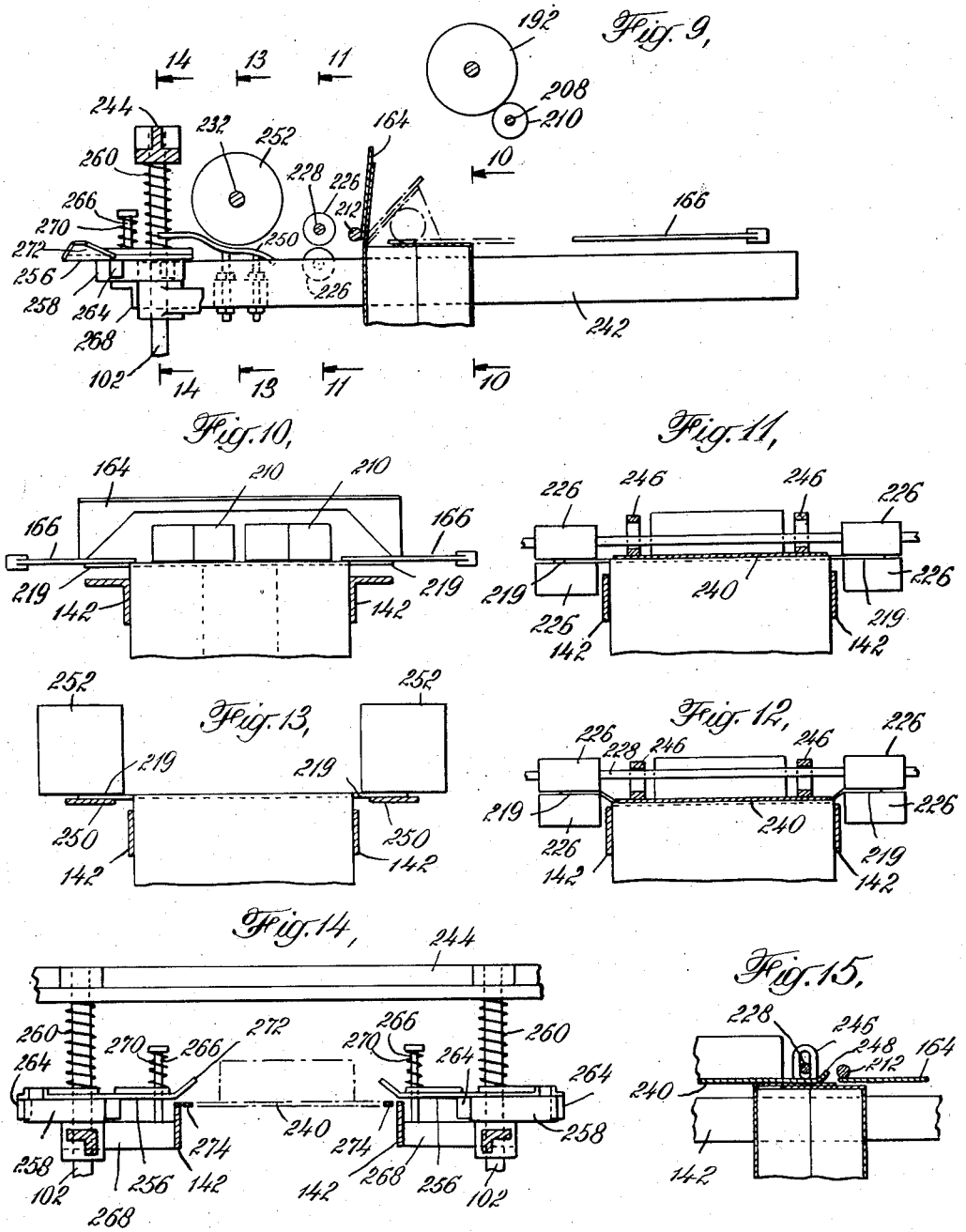

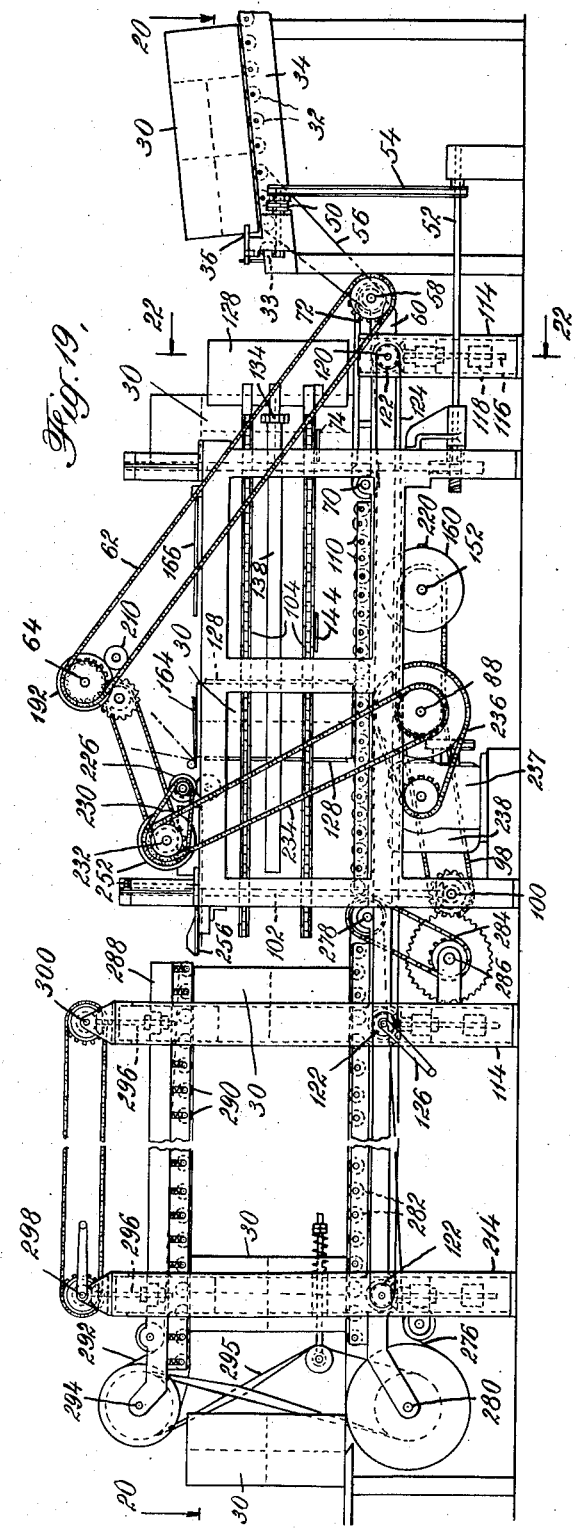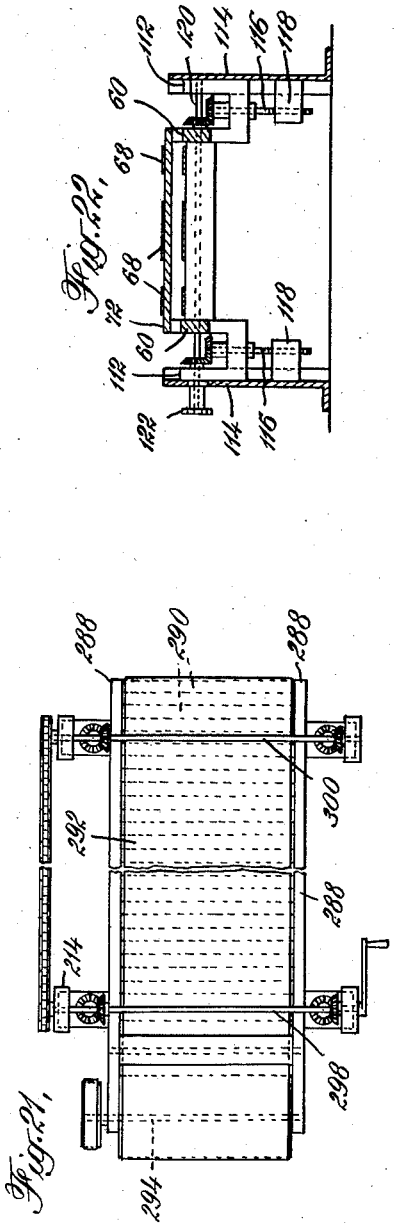

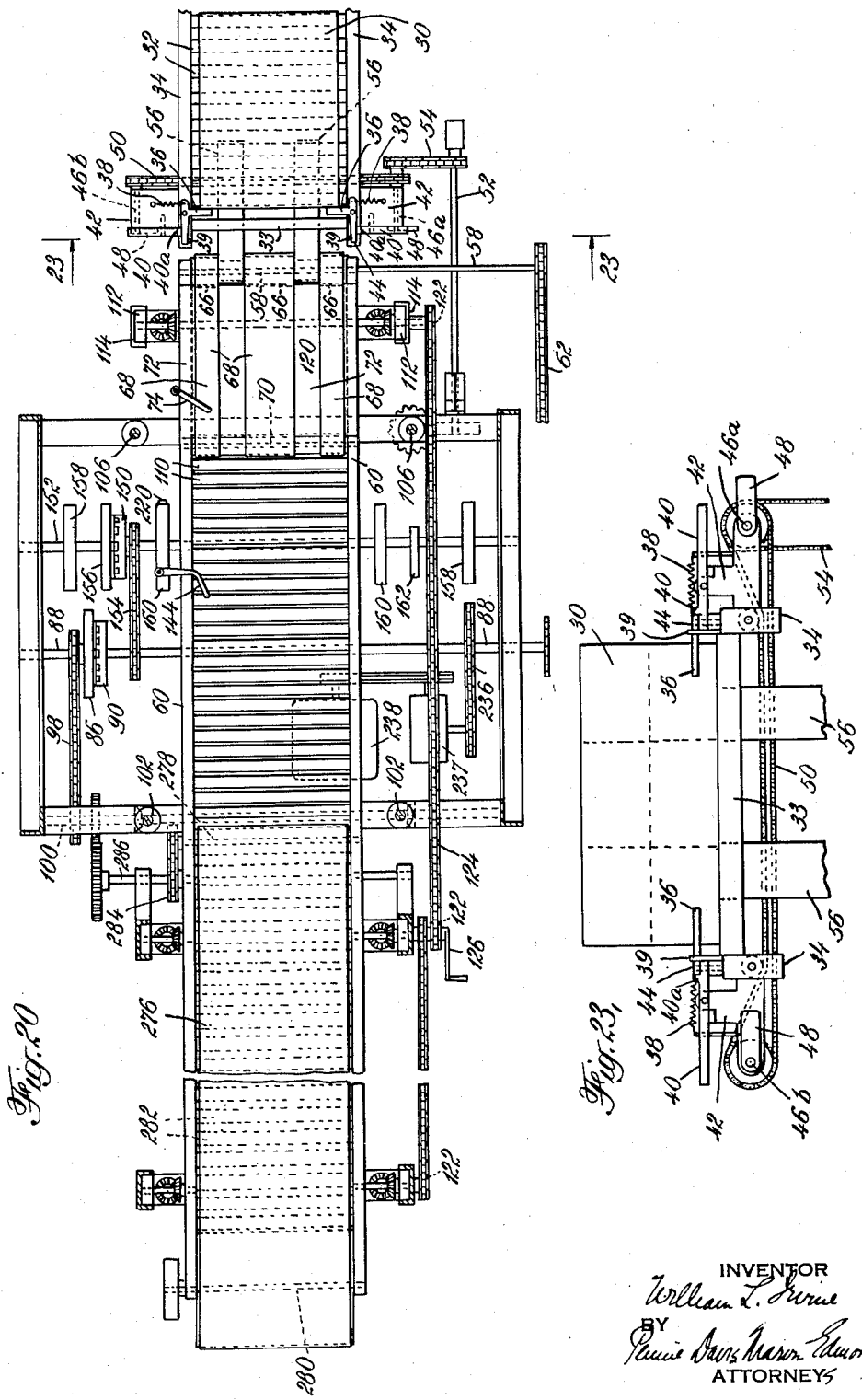

Patented Mar. 27, 1945

2,372,578

UNITED STATES PATENT OFFICE 2,372,578

BUNDLE SEALING MACHINE

William L. Irvine, Brooklyn, N. Y., assignor to The American Sugar Refining Company, New York, N. Y., a corporation of New Jersey Application March 24, 1941, Serial No. 384,927

31 Claims. (Cl. 93—6)

This invention relates to machines for closing and sealing packages of the bag type. More particularly, the invention is concerned with the provision of a novel closing and sealing machine which operates efficiently and rapidly to effect tight closure of such packages of different standard sizes, the contents of which may vary in volume from time to time from natural and other causes. The new machine is especially suitable for operating on packages in the form of large bags of paper stock of either single or multi-wall construction, referred to as bundles, which are used in the distribution of smaller sealed bags of such products as sugar, coffee, and similar commodities. A form of the machine adapted to the closing and sealing of bundles of sealed sugar bags will, accordingly, be illustrated and described in detail for purposes of illustration, although it is to be understood that the utility of the invention is not limited to operations on packages of that specific type.

Heretofore it has been common practice to distribute granulated and similar types of sugar in paperboard cartons which are shipped in fibreboard containers and also in cotton bags shipped in outer burlap or cotton sacks. Such packing serves its purpose satisfactorily but represents a substantial item of expense in the cost of distribution of the commodity. Recently the cartons and cotton bags have been replaced to some extent by sealed paper bags which are distributed in paper bundles each containing, for example, twelve five pound bags. The substitution of the bags and bundles for the packing previously used reduces the cost of distribution, but up to the present, it has been necessary to close and seal the bundles by hand, and such operations are expensive and do not produce bundles which are uniformly tightly sealed.

There are many commercial machines suitable for closing and sealing small bags of relatively light stock, but such machines are not constructed for operation on bundles made of much stiffer material and much larger in size. The problem of closing and sealing bundles for the distribution of bags of sugar is further complicated by the fact that a given weight of sugar varies in volume from time to time, depending on the manner it was produced and other factors. This variation in volume of the contents of the bundles requires that the sealing and closing machine be capable of adjustment so that it will fold the open ends of the bundles closely against the contents and tightly seal the flaps produced by the folding operations, regardless of variations in the bulk of the contents. Preferably, the machine should adjust itself automatically to take care of such variations in volume, since otherwise the machine would be idle while the adjustments are made and the carelessness or neglect of the operator might result in the production of bundles which are improperly closed or sealed.

The present invention is, accordingly, directed to the provision of a machine for uniformly closing and sealing bundles which operates rapidly and efficiently, is capable of handling bundles of different sizes, and adjusts itself automatically to take care of variations in the bulk of the contents of bundles of a given size. The machine folds the open ends of the bundles into flaps, applies adhesive thereto, presses the flaps in place, and holds them until the adhesive has set. The adjustment of the machine for handling bundles of different size is accomplished manually in a simple operation and, when once this adjustment has been made, no change is required, despite variations in the bulk of the contents, until bundles of different size are to be closed and sealed.

The new machine includes a conveyor by which the bundles are advanced from the intake end to a sealing station, allowed to remain at rest at that station for a brief period, and then moved away from the station and through a drier. During its stop at the sealing station, the bundle is subjected to preliminary folding and sealing operations, and the final operations are performed during its movement from the station to the drier. During the travel of the bundle through the drier, its sealed flaps are held in place until the adhesive has set. The conveyor includes means by which the bundles are closely confined while they are in the closing and sealing section of the machine, and the use of such means prevents the bundles from being bulged or distorted and assists in insuring that the sealed bundles will be of uniform shape. The initial closing and sealing operations are performed by folder arms, a backing plate, and other parts of novel construction and operation, which are capable of operating efficiently on the heavy stock of which the bundles are made, and the final operations are performed by other devices of novel construction including movable folding plates. The several folding and sealing devices are so constructed as to perform their functions properly despite variations in the bulk of the contents of the bundles of a given size and the bundles pass through both sections of the machine on a unitary bed which can be manually raised and lowered in a single operation, as may be required for bundles of different size.

For a better understanding of the invention, reference may be made to the accompanying drawings in which Fig. 1 is a side view of that section of the machine in which the folding and sealing operations are performed;

Fig. 2 is a top plan view of the apparatus shown in Fig. 1;

Fig. 3 is a sectional view on the line 3—3 of Fig. 2;

Fig. 4 is a sectional view on the line 4—4 of Fig. 3;

Fig. 5 is a sectional view on the line 5—5 of Fig 1, with parts omitted;

Figs. 6 and 7 are fragmentary end views of parts of the mechanism by which the outer flaps are sealed, the two views showing these parts in different positions;

Fig. 8 is a diagrammatic plan view of the folding and sealing devices;

Fig. 9 is a diagrammatic sectional view on the line 9—9 of Fig. 8;

Figure 1:
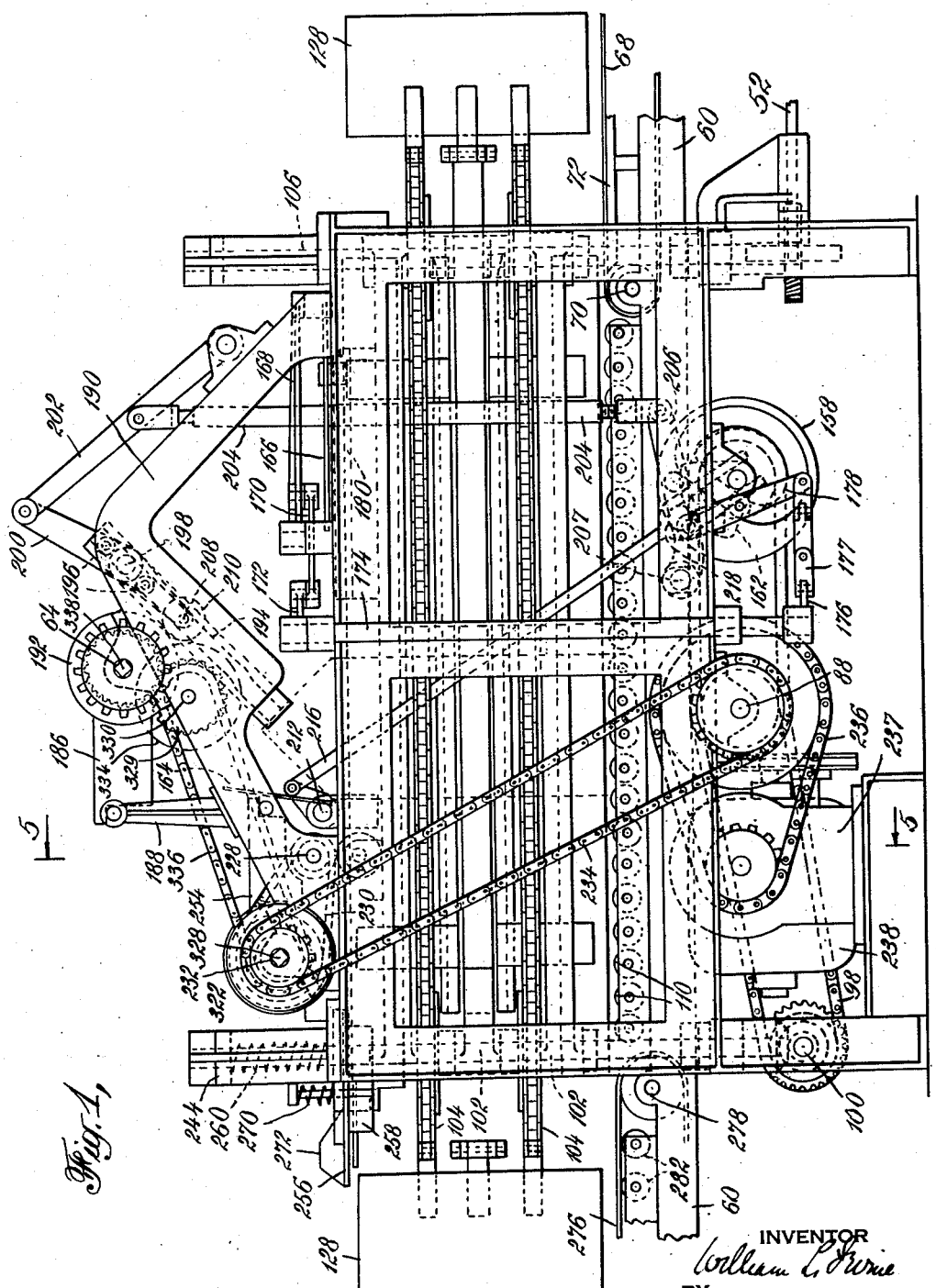

Figs. 10 and 11 are sectional views on the lines 10—10 and 11—11, respectively, of Fig. 9;

Fig. 12 is a view similar to Fig. 11 but showing the parts operating on bundles, the contents of which are lower in height than that shown in Fig. 11;

Figs. 13 and 14 are sectional views on the lines 13—13 and 14—14, respectively, of Fig. 9;

Fig. 15 is a fragmentary sectional view illustrating the mounting of a floating weight employed in the machine;

Fig. 16 is a sectional view on the line 16—16 of Fig. 17 of a clutch employed in the machine;

Fig. 17 is an end view of the clutch shown in Fig. 16;

Fig. 18 is a sectional view on line 18—18 of Fig. 2;

Fig. 19 is a view in side elevation of the complete apparatus, with parts removed;

Fig. 20 is a sectional view on the line 20—20 of Fig. 19;

Fig. 21 is a top plan view of the drier section of the machine;

Fig. 22 is a sectional view on the line 22—22 of Fig. 19;

Fig. 23 is a sectional view on the line 23—23 of Fig. 20; and

Fig. 24 is a plan view of folding mechanism of modified form.

The machine illustrated is constructed for sealing and closing bundles containing twelve five pound bags of sugar and each such bundle is about 22½" long from its bottom to its top when the upper end is open, and its cross-sectional dimensions are about 7½" by 15". The sugar bags are inserted into the bundles 30 at a filling station (not shown) and the bundles are there deposited on a series of rollers 32 forming the top of a table 34 sloping downwardly toward the machine, the bundles lying on their broad sides on the rollers and having their open ends to the rear.

At the end of the table near the machine, a pair of bell crank trip levers are pivoted on the side rails of the table and each lever has an arm 36 overlying the top of the table. The levers are acted on by springs 38 holding them against pins 39 so that one arm of each lever lies at right angles to the axis of the table and in the path of the advancing bags. Adjacent each lever is a latch 40 pivoted on a bracket 42 attached to a side rail of the table and each latch has a projection 40a engaging the tail 44 of its lever and holding it against movement tending to stretch the spring. Shafts 46a and 46b are journaled in the brackets and fast on each shaft is an arm 48 which, as the shaft rotates, strikes its latch and frees it from its bell crank lever. As the bundles move along the series of rollers, their progress is arrested by the trip levers until the arms 48 on the shafts release the latches. When this occurs, the bundles move forward, swinging the trip levers out of the way and advancing over a fixed bar 33 at the end of the table which retards the bundles slightly.

The shafts 46a, 46b are driven in unison by a chain 50 trained about sprocket wheels thereon and shaft 46a is driven by a shaft 52 through a chain 54. Shaft 52 is actuated by other parts of the machine to be described and the construction is such that the bundles are delivered to the machine in timed relation to the operation of certain parts thereof.

A pair of belts 56 are trained about a number of rollers 32 upward from the bar 33 at the lower end of the table and these belts run on pulleys on a shaft 58 journaled in brackets in the side rails 60 of the machine. Shaft 58 is driven by a chain 62 from shaft 64, rotating continuously throughout the operation of the machine, and carries pulleys 66. Belts 68 run on pulleys 66 and also on pulleys on a shaft 70 journaled in the side frames of the machine. Whenever a bundle stopped by trip levers 36 is permitted to advance by the release of the latches of the levers, the bundle is advanced by belts 56, moves over the end of the table 34, and drops upon the belts 68, turning in its fall so that it lands on its bottom. The belts 68 are supported from beneath on a plate 72 so that they can stand the impact and weight of the bundles without sagging.

Each bundle deposited upon the continuously operating belts 68 is advanced thereby with its broad side foremost and, in such movement, the bundle strikes and swings a lever 74 (Fig. 4) pivoted on one side frame of the machine and connected by a pull rod 76 to one arm of a spring-pressed crank 78 on a shaft 79 journaled in a suitable frame member. Another crank 80 on shaft 79 is connected by a pull rod 81 to a lever 82 (Figs. 16, 17) pivoted on a bracket extending inward from the machine frame. Lever 82 is normally in a position to overlie a spring-pressed detent 84 mounted in a radial slot in a disc 86 loose on continuously rotating shaft 88, the disc forming the driven member of a one-revolution clutch. A disc 90 forming the driver member of the clutch is fast on shaft 88 and disc 90 bears against one edge of the detent and has a portion which overhangs the outer end thereof and is provided with recesses 92. When the lever 74 is engaged and swung by a bundle, the lever 82 is pulled from its position over the top of the detent and the latter is then forced outwardly by its spring and enters one of the recesses 92 to connect the driver and driven members of the clutch. As the bundle passes by the lever 74, the latter is restored to its original position by a spring 94 acting on the connections between that lever and lever 82 and by the time the detent has made one revolution, lever 82 has moved back to overlie its end and force it out of the recess in the driven member 90. This releases the driven member and the clutch thus operates for one revolution only.

A sprocket wheel 96 (Fig. 4) is mounted on the hub of the driven member 86 and drives a chain 98 which, in turn, drives a sprocket wheel on a shaft 100 extending across the machine and journaled in the frame members thereof. Vertical shafts 102 on either side of the machine are driven from shaft 100 by suitable bevel gearing and on each vertical shaft are upper and lower sprocket wheels driving upper and lower chains 104. These chains are also trained about upper and lower sprocket wheels on vertical shafts 106 at the opposite end of the machine.

The chains 104 form parts of conveying means by which the bundles are advanced through the machine on a bed (Fig. 22) comprising side rails 60 between which extend rollers 110, the side rails extending through both the closing and sealing section and the drier section of the machine. The side rails are provided with brackets 112 movable vertically in guideways in standards 114 and the position of the brackets is determined by adjusting screws 116 threaded therethrough and through fixed blocks 118 on the standards. The brackets 112 are arranged in pairs in standards 114 aligned across the machine and the screws of each pair are driven by bevel gearing through a cross-shaft 120 mounted in each pair of aligned brackets and passing through slots in the standards, all of the cross-shafts having sprocket wheels 122 connected by a chain 124. One of the shafts 120 is provided with a crank 126, the turning of which turns all the adjusting screws to raise or lower the bed, as may be necessary to take care of bundles of different sizes. Since the bed extends through both sections of the machine, a single adjustment places both sections in condition to handle bundles of different heights.

A plurality of conveying plates 128 are pivotally mounted on the upper and lower conveyor chains 104 on each side of the machine and, for this purpose, each plate is provided with upper and lower arms 130 pivoted to links of its chains. Between arms 130, another arm 132 mounted on each plate carries a head 134 having pins in its ends on each of which are mounted pairs of upper and lower rollers 136. At the intake end of the machine, a cam track 138 is mounted on suitable brackets between the conveyor chain sprocket wheels and the track is engaged by the blocks of the plates. Adjacent the sprocket wheels at the intake end of the machine, the shape of the cam track is such as to cause the plates to swing to radial positions with reference to the sprocket wheels. Each cam track continues along to a point near the sprocket wheels at the discharge end of the machine and guideways 140 are mounted on suitable brackets above and below that section of each cam track extending between the sprocket wheels. The upper and lower rollers on each block 134 enter the guideways and the plates 128 are thereby held at right angles to their chains and in proper position to engage the bundles and advance them over the bed of the machine. Rails 142 are mounted on brackets above and below the guideways 140 and the rails engage the sides of the bundles and confine them laterally in their movement along the bed. The guideways 140 and rails 142 on opposite sides of the bed converge from the intake end of the machine for a part of their length and thereafter lie parallel.

The plates 128 on each pair of chains are arranged in pairs and all plates on one pair of chains have a slot so that the plate may pass lever 74. When a bundle has advanced along the bed and engaged the lever 74, the front face of the bundle comes into contact with the rear surfaces of a pair of front plates 128, one on each pair of chains. The swinging of lever 74 starts the conveyor chains and while the bundle is still being advanced by the belts 68, the back pair of plates 128 on the chains moves up behind the bundle and engages its rear face. The spacing between the front and back plates 128 is such that the plates lie in firm contact with the opposite broad faces of the bundle and since the plates on the two sets of chains are in alignment and extend almost across the bed of the machine, the bundle is confined in a pocket. As the bundle is advanced along the bed through the converging stretches of the chains, the ends of the aligned plates on the two chains move toward one another and when the bundle has reached the place where the guideways 140 and rails 142 have started to run parallel, the bundle is closely confined by the plates on its front and back surfaces and by the rails at its sides. When the bundle has fully entered the parallel stretches of the chains, the driven member 86 of the one-revolution clutch is released and the bundle comes to rest in order that the closing and sealing operations may be performed thereon. This position of the bundle is indicated at A in Fig. 4.

Just before the bundle reaches the position A, it engages an arm 144 (Fig. 4) fast on a vertical shaft on which is also mounted an arm 146 connected by a link to a lever 148 controlling the operation of a one-revolution clutch. The clutch includes a driver 150 loose on a shaft 152 and having a sprocket wheel on its hub by which it is driven through a chain 154 from the continuously rotating shaft 88. The clutch is similar in construction to that made up of the driven member 86 and driver 90 (Fig. 16) and when arm 144 is swung and in turn swings lever 148, the driver 150 is connected to and drives driven member 156 and also shaft 152. Shaft 152 carries a number of cams by which the elements of the folding and sealing mechanism are actuated. Of these cams, those designated 158 operate folder arms, cams 160 operate gluing means, and cam 162 operates a back plate which takes part in the folding and sealing operations.

As the bundle enters the station A, it comes to rest with the front face of its open end against a back plate 164 (Fig. 9). Thereafter, a pair of folding arms 166, one on each side of the machine (Figs. 2, 9), advance to force the rear free end of the bundle inwardly and against the top of the contents. Each folder arm (Fig. 2) is pivoted on the end of an arm 168 pivotally connected to the ends of a link 170 and an arm 172 fast on vertical shaft 174, the link 170 being pivoted to the framework of the machine and shaft 174 journaled on the framework. As the shaft 174 is rocked, the arm is given a rectilinear movement to and fro. Shaft 174 is provided with an arm 176 connected by a universal link 177 to the end of a lever 178 pivoted on the framework of the machine and having a roller entering a track in cam 158. As the cam is rotated, it causes shaft 174 to swing in one direction and then to return once for each revolution of shaft 152.

Each folder arm 166 is provided with a roller entering a track in a cam plate 180 (Fig. 2) and, as arm 168 is reciprocated, its folder arm 166 has a movement determined by the track in the cam plate and indicated by the dotted line 182 (Fig. 8). The ends of the folder arms first move to bend the rear free end of the bundle inwardly over the contents, and then move forwardly and out to force the sides of the bundle outwardly. When the arms have reached the dotted line position indicated at 184 (Fig. 8), the arms come to rest. At the same time, a gluing roll moves downwardly to apply adhesive to the inner face of the front side of the free end of the bundle.

The gluing mechanism includes a pot 186 (Figs. 1, 3) mounted on arms 188 rising from upward extensions 190 of the frame and the rear end of the pot is closed by a continuously rotating roll 192 on shaft 64. The extension 190 includes guideways 194 (Fig. 3) in which run rollers 196 on heads on the ends of a cross-bar 198 attached by links 200 to levers 202 pivoted on the extension 190. A pull rod 204 connects each lever 202 with the end of a crank 206 fast on a rock shaft 207 and each crank 206 carries a roller operating in a track in one of the cams 160. By the action of the cam and the other parts described, the cross-bar 198 is moved up and down along the guideways 194 in timed relation to the other parts of the machine. The cross-bar carries forwardly extending arms connected by a shaft 208 on which are mounted glue rolls 210 (Figs. 3, 9). When the cross-bar is in its uppermost position, rolls 210 contact with the continuously rotating roll 192 and pick up glue therefrom. Thereafter, under the action of cams 160, the cross-bar is moved downwardly and rolls 210 apply glue to the inner surface of the front wall of the bundle.

As the bundle reaches the station A, the front wall of the bundle comes to rest against the backing plate 164 and is thereafter moved inward by the operation of that plate in successive steps. In the first step, the plate moves the wall of the bundle to an inclination of about 45°, as illustrated in Fig. 9, and then stops. During that operation, the gluing rolls 210 have moved down below the upper edge of the bundle and have also been moved toward the inner surface of the bundle by the offset end portions 194a of the guideways 194. When the gluing rolls are at the bottom of their travel, the backing plate 164 forces the front of the open ends of the bundle against the rolls and on their return movement, they apply glue to the inner surface of that front end.

The backing plate 164 is secured to a shaft 212 extending across the framework of the machine and having an arm acted on by a spring 214 which tends to swing the plate clockwise, as shown in Fig. 3. Also, fast on shaft 212 is an arm connected to a link 216 which carries a roller 218 held in contact with the surface of cam 162 by spring 214. The link 216 has a bifurcated end which straddles shaft 152 so that the link is kept in proper relation to the cam. With this arrangement, the backing plate applies yielding pressure to the front wall of the bundle to fold it inward and it is given a positive return movement by the cam.

In the closing and sealing operation, the folder arms 166 first move inward and then outward to come to rest in the position 184 (Fig. 8). As this movement proceeds, the backing plate folds the front free end of the bundle inwardly to the inclined position shown in Fig. 8. At the same time, the glue rolls 210 have moved downwardly to their lowermost position. The cam 162 then permits the spring 214 to move the backing plate downwardly slightly to bring the surface of the bundle in contact with the gluing rolls. The rolls are then moved upwardly and when they have cleared the bundle, the folder arms move to their outermost positions, shown in Fig. 8, and at the same time, the backing plate moves further down to force the glued surface of the bundle against the upper surface of the back portion of the bundle which has been folded inwardly by the initial operation of the arms. The backing plate remains in this position and the arms are then returned in a continuous movement to their outermost position, shown in full lines in Fig. 8. The operation of the arms as described has caused the sides of the free end of the bundle to be folded into two outwardly extending triangular flaps 219 (Fig. 8).

During the preliminary folding and sealing operations described, the conveyor chains are at rest and when these operations have been completed, the chains are again brought into action to advance the bundle and complete the folding and sealing. The folder arms, gluing rolls, and backing plate are operated during one revolution of shaft 152 and as this shaft near the end of that revolution, a projection 220 on one of the cams 160 engages a bell crank 222 (Fig. 3), which is connected through a link to crank 224 connected to shaft 79 on which cranks 78 and 80 are mounted. The projection 220 on cam 160 acts through the connections described to swing lever 82 and thus connect driver 90 on shaft 88 to driven member 86. When the driven member is thus connected, it drives the conveyor chains through the connections previously described.

As the chains move forward, they advance the partially sealed bundle from the position A toward the discharge end of the machine. In that movement, the bundle passes from beneath the backing plate, which has remained in its lowermost position, and the flaps 219 pass between upper and lower rolls 226 which compress and crease the flaps. The lower rolls (Fig. 5) are mounted on shafts journaled in the framework of the machine, and the upper rolls are mounted on a cross-shaft 228. The shaft 228 is driven through a chain 230 from a shaft 232 driven through a chain 234 from shaft 88 which is in turn continuously driven through a chain 236 and a speed reducing device 237 by motor 238. The shaft 228 is journaled on the framework and it drives the lower rolls 226 through gears. As the flaps 219 pass between upper and lower rolls 226, they are flattened and their creases made sharp.

A weighted plate 240 lies in the path of the bundle advancing past rollers 226 and this plate has rods 242 secured to its rear end and extending through openings in a cross-bar 244 of the frame. The rods support the plate but permit free upward movement thereof. At its forward end, the plate is provided with loops 246 through which the shaft 228 extends and as the bundle passes beneath the turned up front end 248 of plate 240, it raises the plate so that the latter bears with full weight on the sealed portions of the bundle.

As the bundle passes beneath the weighted plate, the tabs 219 are engaged from beneath by plates 250, one on each side of the machine. Above each plate is a continuously rotating glue roll 252 mounted on shaft 232, each roll closing the front end of a glue pot 254. The shape of the plates 250 is such that as the flaps move thereover, they are brought into contact with the surface of the glue rolls and glue is applied to the upper faces thereof.

Beyond the glue rolls 252 are folding and pressing plates 256 (Fig. 2) resting on the tops of cams 258 fast on the shafts 102 at the discharge end of the machine, through which the conveyor chains are driven. The rear end of each plate is slotted to straddle the shaft and the plate is held against its cam by a spring 260 encircling the shaft and bearing at its upper end against the cross-bar 244. The plate is provided with spaced rollers 264 on its under surface bearing against the cam at opposite points and the movement of the plate is guided by a rod 266 mounted in a short cross-bar 268 of the frame and encircled by a spring 270 which bears against the plate and against a head at the upper end of the rod. The plates 256 have a movement at about 45° to the direction of movement of the bundle and the plates move inwardly over the path of the bundle and then return. The inner end 272 of each plate is bent upwardly, as indicated.

As the bundle moves forward and its flaps 219 pass from beneath the gluing rolls 252, the flaps are in a partially raised position resulting from the shape of the supporting plates 250. The weighted plate 240 extends beyond the gluing rolls 232 and a pair of narrow arms 274 project from the rear edge of the plate at the sides thereof. As the bundle moves to the point where the flaps are free of the gluing rolls, the forward edges of the flaps engage the bent up ends 272 of plates 256, the plates being then in their retracted position. This causes the flaps to stand erect (Fig. 6) and at that point in the progress of the bundle, the plates 256 begin to move inward to fold the flaps down around the arms 274. The inward movement of the plates 256 forces the glued surfaces of the flaps into contact with the portions of the bundle previously secured together and this folding is accomplished with sharp creases by reason of the arms 274 lying within the folds.

As they move away from the sealing position, the bundles remain tightly confined on their sides between the conveyor plates 128 and the upper and lower rails 142. As the forward plates 128 pass beyond the ends of the track 138 and guideways 140, the plates are free to swing on the chains. The rear pair of plates engaging each bundle propel the bundle along the lower bed and transfer it to a belt 276 trained around pulleys on shafts 278 and 280 journaled in the side rails of the bed, the upper stretch of the belt being supported from beneath by rollers 282 mounted in the rails. At about the time the bundle has thus been transferred to the belt, the rollers on the blocks 134 of the conveyor plates have passed out of contact with the guideways and the plates are, accordingly, free to swing to the rear so that as they are carried along by the conveyor chains moving about their sprocket wheels at the discharge end of the closing and sealing section, the conveyor plates will do no injury to the bundles by reason of moving angularly relative thereto.

The shaft 278 for belt 276 is driven by a chain 284 from a shaft 286 journaled in brackets on standards 114. Shaft 286 is driven from shaft 100 but at a lower rate of speed so that the belt 276 carries the bundles through the drier section of the apparatus more slowly than it is advanced by the conveyor chains.

Mounted in the standards 114 above the path of the bundle is a frame made up of side rails 288 between which extend rollers 290. The pintles of the rollers lie in slots in the rails and are held in lowermost position by springs. A belt 292 encircles the group of rollers and also a pulley on a shaft 294 journaled in the rails 288. Shaft 294 is driven from shaft 280 by a belt 295 held taut by a spring-pressed idler. The side rails 288 are hung from adjusting screws 296 threaded through blocks in standards 114 and the pairs of screws at the ends of the rails are operable in unison to raise and lower the rails. For this purpose, a shaft 298 is journaled in one pair of standards and connected by a chain to a shaft 300 in the other pair of standards. The shafts are geared to the respective screws 296 and shaft 298 can be operated by a handle to rotate all of the screws in unison. The upper frame is adjusted so that the belt 292 lies in snug contact with the tops of the bundles advancing through the drier section and this contact holds the glued flaps together until the glue has set. Beyond the end of the drier section, the bundles are discharged from the belts 276 upon a table or another conveyor, as desired.

In Fig. 24, there is illustrated a folder arm 302 performing the same function as arm 166 but of modified construction. The arm is pivoted at one end to a link 304 pivoted on a suitable frame member and between its ends, it is connected by a link 306, which is adjustable in length, to an arm 308 which is pivoted between its ends to an arm 310 on shaft 312, which is similar to the shaft 174. The arm 308 has a longitudinal slot 314 through which extends a pin 316 entering a slot in a bracket 318 extending outwardly from the frame member. The folder arm 302 has a roller entering a track in a cam plate 320 secured to the framework of the machine. With this construction, the swing of the free end of the folder arm can be varied so as to form the triangular tabs 219 on bundles which have varying free lengths above their contents.

When the machine is to be started, the glue rolls 192 and 252 must be entirely covered with glue before bundles are fed to the machine. To facilitate such operations, the shaft 232 carries a disc 322 loosely mounted thereon and the disc is provided with a pawl 324 engaging a ratchet wheel 326 fast on shaft 232. The chain 234 is trained about a sprocket wheel on the hub of disc 322 and, with this arrangement, shaft 232 may be freely rotated in one direction by a tool applied to its squared end 328. In a similar manner, shaft 64 is driven through gears 329 from a shaft 330 fast on which is a ratchet wheel 332 driven by a pawl on a disc 334 which is loose on the shaft and has a sprocket wheel on its hub driven through a chain 336 from shaft 232. This arrangement permits shaft 64 to be freely driven in one direction by a tool applied to its squared end 338. Accordingly, before the machine is put into operation, shafts 64 and 232 are turned manually until rolls 192 and 252 are completely covered with glue.

When the machine is thus ready for operation, each bundle filled at the filling station moves by gravity therefrom along table 34 until it engages the trip levers 36. As part of the initial adjustment, the machine has been put in such condition that the latches of the levers are released and the first bundle, accordingly, moves at once past the levers, falls off the end of the table, and lands on the belts 68. The bundle is at once advanced by the belts toward the front pair of conveyor plates which are to form part of the pocket in which the bundle is to be confined. In that movement of the bundle on the belts, it swings the lever 74 and starts the conveyor chains in operation. The bundle is advanced to the closing and sealing station by the conveyor and on its way to that station, the bundle swings the lever 144 starting the closing and sealing devices. While the bundle is at rest at the station, the first folding operation is performed by the folder arms and the first gluing and sealing operations are completed. Just before these operations are finished, the clutch controlling the conveyor has been thrown in by the projection on one of the glue roll cams. The conveyor then carries the bundle away from the station A and the gluing and sealing of the outer flaps is completed and the bundle delivered to the belt which carries it through the drier.

The trip lever latches are controlled by the conveying mechanism and the timing is such that a bundle will not be released from the table leading from the filling station until the conveyor plates are in proper position to receive it. This prevents jamming of the machine but ordinarily there is no considerable delay in the feeding of bundles and so long as the supply is available, they move through the apparatus without substantial interruption.

The bundles are advanced through the sealing mechanism with their broad sides foremost and this effects a reduction in the cost of the bundles, since the first portions folded inwardly over the top of the contents need have a length only slightly greater than one-half the thickness of a bundle. The feeding and folding of the bundles in the manner described is made possible by the use of the cam controlled folder arms and without those arms or similar mechanism performing their functions, the first folding and sealing operations could not be efficiently performed with the infolded material snugly fitting against the top of the contents.

The main bed of the machine extending through both the closing, sealing, and drier sections may be raised and lowered by operation of the handle 126 to adjust the machine to take care of bundles of different sizes. The top frame of the drier section can also be adjusted by rotation of shaft 298 whenever that is necessary. Heretofore driers had been used with closing and sealing apparatus, but the two pieces of apparatus have not had a bed in common. As a consequence, when adjustments in the bed of the closing and sealing machine have been required, separate adjustments of the bed of the drier have been necessary and this has resulted in packages being improperly closed and sealed because of the difficulty of making uniform adjustments in the two machines.

In the new machine, the minor adjustments required by variations in the bulk of the contents of a bundle of a given size are effected automatically. For this purpose, the folder arms 166 are placed sufficiently high to take care of any such variations and the backing plate 164 is similarly mounted at a high point. The rolls 226 are mounted high as are also the glue rolls 252. The floating weighted plate 240 is low and is lifted by the bundles, as required, and the folder and presser plates 256 are also low and may be moved upwardly by the bundle against springs 260, 270 so that they may function properly, regardless of minor increases in the height of the bundles.

The vertical adjustments above described enable the new machine to close and seal bundles, the contents of which vary in height, and, if desired, the machine may be constructed to handle bundles of varying horizontal dimensions. For this purpose, the conveying means and the side rails 142, at opposite sides of the machine, are mounted for adjustment toward and away from one another and plates 128 of appropriate size are mounted on the chains 104 at distances apart determined by the bundles to be operated on. Various other minor adjustments, which will be obvious, may also be required.

I claim:

1. In a machine for closing and sealing the open tops of bundles, the combination of means for advancing a bundle with an open top in upright position, movable members for forcing one wall of the top inwardly, a plate engaging the wall opposite to that forced inwardly, means for applying adhesive to the inner surface of said opposite wall, means for moving the plate to fold said opposite wall over and upon the infolded wall and to form the remaining walls of the top into flaps, means for applying adhesive to surfaces of the flaps, and means for folding said flaps inwardly against the previously infolded parts.

2. In a machine for closing and sealing the open tops of bundles, the combination of means for advancing a bundle with an open top in upright position, a pair of arms movable in unison to force the rear wall of the top inwardly, a plate engaging the front wall of the top, means for applying adhesive to the inner surface of said front wall while it is engaged by the plate, means for moving the plate to fold the front wall over and upon the infolded rear wall and to form lateral flaps, means for applying adhesive to surfaces of the flaps, and means operable to fold said flaps against the previously infolded parts and press the infolded flaps in position.

3. In a machine for closing and sealing the open tops of bundles, the combination of means for advancing a bundle with an open top in upright position, movable arms for forcing one wall of the top inwardly, a plate engaging the wall opposite that folded inwardly, means for applying adhesive to the inner surface of said oposite wall, means for moving the plate to fold said opposite wall over and upon the infolded wall and to form the laterally adjacent walls into flaps, means for applying adhesive to surfaces of the flaps, means for pressing the infolded walls together, and movable plates for folding the flaps inwardly and pressing them against the previously infolded parts.

4. In a machine for closing and sealing the open tops of bundles, the combination of means for advancing a bundle with an open top in upright position, movable arms mounted on opposite sides of the path of travel of the bundle and operating to force the rear wall of the top inwardly, a plate engaging the front wall of the top and holding it in position, means for applying adhesive to the inner surface of the front wall while it is so held, means operable to move the plate after application of the adhesive to fold the front wall over and upon the infolded rear wall and to form lateral flaps, means for applying adhesive to surfaces of the flaps, and means including movable plates for folding the flaps inwardly to cause them to adhere to previously infolded portions.

5. In a machine for closing and sealing the open tops of bundles, the combination of means for advancing a bundle with an open top in upright position, said means confining the bundle on all sides and preventing distortion thereof, means for forcing the rear wall of the top inwardly, a plate engaging the front wall of the top, means for applying adhesive to the inner surface of said front wall, means for moving the plate to fold the front wall over and upon the infolded rear wall and form lateral flaps, means for applying adhesive to surfaces of the flaps, and means for folding said flaps inwardly against the previously infolded parts.

6. In a machine for closing and sealing the open tops of bundles, the combination of means for advancing a bundle with an open top in upright position to and away from a station, the bundle remaining at rest momentarily at the station, means operating on the bundle while it is at rest at such station to fold opposite walls of the open top inward one upon the other and to secure said walls together and to form the remaining walls into flaps, said means including movable members acting on one of said opposite walls, a movable element for applying adhesive to the inner surface of the other of said opposite walls, and a plate supporting said latter wall during application of said adhesive and operating thereafter to fold said wall inwardly, and means operating on the bundle during its travel away from the station for applying adhesive to the flaps and folding said flaps inwardly upon the previously infolded portions.

7. In a machine for closing and sealing the open tops of bundles, the combination of means for advancing a bundle with an open top in upright position to and away from a station, the bundle remaining at rest momentarily at the station, means operating on the bundle while it is at rest at such station to fold opposite walls of the open top inward one upon the other and to secure said walls together and to form the remaining walls into flaps, said means including movable members acting on one of said opposite walls, a movable element for applying adhesive to the inner surface of the other of said opposite walls, and a plate supporting said latter wall during application of said adhesive and operating thereafter to fold said wall inwardly, and means operating on the bundle during its travel away from the station for applying adhesive to the flaps and folding said flaps inwardly upon the previously infolded portions, said means including folding plates reciprocable over the top of the bundle.

8. In a machine for closing and sealing the open tops of bundles, the combination of means for advancing a bundle with an open top in upright position, a pair of members movable in horizontal planes to force one wall of the top inwardly, a plate engaging the wall opposite that folded inwardly, means for applying adhesive to the inner surface of said opposite wall while it is engaged by the plate, means for moving the plate to fold said opposite wall over and upon the infolded wall and to form said laterally adjacent walls into flaps, a floating weight for pressing together the infolded walls, means for applying adhesive to surfaces on the flaps, and means for folding said flaps inwardly against the previously infolded parts, said means including plates mounted for vertical movement and biased in a downward direction.

9. In a machine for closing and sealing bundles, the combination of means for advancing a bundle with an open top in upright position to a bed, conveyor means operable to advance the bundle along the bed to a station and to move the bundle along the bed away from the station, means engageable by the advancing bundle for causing the conveyor means to advance the bundle to the station and then stop, means brought into action by the bundle as it approaches the station for folding inward and securing together the front and rear walls of the open top of the bundle and forming the side walls into flaps, means actuated by said folding and forming means near the conclusion of the operations thereof for bringing the conveying means into action to move the bundle away from the station, and means for folding said flaps inwardly and securing them to the previously infolded portions as the bundle is moved away from said station.

10. In a machine for closing and sealing bundles, the combination of means for advancing a bundle with an open top in upright position to a bed, conveyor means operable to advance the bundle along the bed to a station and to move the bundle along the bed away from the station, means engageable by the advancing bundle for causing the conveyor means to advance the bundle to the station and then stop, means brought into action by the bundle as it approaches the station for folding inward and securing together opposite walls of the open top of the bundle and forming the remaining walls into flaps, means for actuating the folding and forming means, means operated by said actuating means near the conclusion of the operation of the folding and forming means for bringing the conveying means into action to move the bundle away from the station, and means for folding said flaps inwardly and securing them to the previously infolded portions as the bundle is moved away from said station.

11. In a machine for closing and sealing the tops of bundles, the combination of a pair of members operating to fold inwardly one wall of the bundle, a plate engageable by the wall opposite to that folded inwardly, means for applying adhesive to the inner surface of said opposite wall while it is engaged by the plate, and means for operating the plate after application of said adhesive to fold said opposite wall inwardly and upon the previousy infolded wall.

12. In a machine for closing and sealing the open tops of bundles, the combination of means for inwardly folding and securing one upon the other the opposite wall of the top of a bundle and forming the remaining walls into flaps, means for applying adhesive to the flaps, and means for folding the flaps inwardly and securing them to the previously infolded portions, said means including a pair of plates reciprocable horizontally over the top of the bundle and mountings on which the plates may be moved bodily upwardly by the bundle in accordance with variations in the height of the contents of the bundle.

13. In a machine for closing and sealing the open tops of bundles, the combination of means for inwardly folding and securing one upon the other the opposite wall of the top of a bundle and forming the remaining walls into flaps, means for applying pressure to the infolded portions to force them together, said means being movable in accordance with variations in the height of the contents of the bundle, means for applying adhesive to surfaces of the flaps, and means for folding the flaps inwardly upon and securing them to the previously infolded portions, said means including a pair of plates reciprocable horizontally and mountings on which the plates may be moved bodily upwardly by the bundle in accordance with variations in the height of the bundle.

14. In a machine for closing and sealing the open tops of bundles, the combination of means for folding one wall of the top of a bundle inwardly, a plate engaging and supporting the opposite wall, means for applying adhesive to the inner surface of said opposite wall, and means operating after application of said adhesive for moving the plate to cause it to fold said opposite wall inward and upon the previously infolded wall.

15. In a machine for closing and sealing the open tops of bundles, the combination of means for securing together opposite walls of the top of a bundle, one upon the other, the remaining walls being formed into flaps, means for pressing the infolded portions together, means for applying adhesive to the flaps, and means for folding the flaps inward and securing them to the previously infolded portions, said means including a pair of elements over which the flaps are folded to form tight creases, and a pair of horizontally reciprocating plates engaging and folding said flaps, said elements and plates being mounted to move vertically in accordance with variations in the height of the contents of the bundle.

16. In a machine for closing and sealing the open tops of bundles of oblong horizontal cross-section, the combination of means for advancing a bundle upright and broad side foremost, means for folding inward the broad front and rear walls of the open top, one upon the other, and securing said walls together, such operations forming flaps of the side walls, said folding means including a plate engaging said front wall and movable to fold said wall downwardly and a pair of arms operable to engage and fold the rear wall downwardly, means for applying adhesive to the flaps, and means for folding the flaps inward upon and securing them to the previously infolded portions.

17. In a machine for closing and sealing the end of an open top bundle of oblong horizontal cross-section, the combination of means for advancing the bundle in upright position broad side foremost, said means confining the bundle on all four sides, means for folding inwardly and securing together the broad front and rear walls of the top of the bundle, one upon the other, such operations forming flaps of the side walls of the top, said folding means including a plate engaging said front wall and movable to fold said wall downwardly and a pair of arms operable to engage and fold the rear wall inwardly, means for applying adhesive to the flaps, and means for folding the flaps inward upon and securing them to the previously infolded portions.

18. In a machine for closing and sealing bundles, a plate engaging one wall of a bundle, means for applying adhesive to the inner surface of said wall, and means for operating the plate to hold said wall in place during application of said adhesive and to fold said wall downward over the top of the contents of the bundle after the adhesive has been applied.

19. In a machine for closing and sealing bundles, the combination of a pressure member engaging infolded top portions of bundles advancing along a path, each bundle having other top portions projecting at the sides of the member, extensions from said member lying along the lines of junction of said other top portions with the remainder of the bundle, and a mounting for the pressure member on which it is free to move up and down to a limited extent.

20. In a machine for closing and sealing the open tops of bundles, the combination of means for advancing a bundle with an open top in upright position, means for folding one wall of the top inwardly, a plate engaging the wall opposite to that folded inwardly, means for applying adhesive to the inner surface of said opposite wall, means operable after application of the adhesive for moving the plate to fold said opposite wall over and upon the infolded wall, the remaining walls being formed into flaps, means for applying adhesive to surfaces of the flaps, and means for folding the flaps inwardly against the previously infolded parts.

21. In a machine for closing and sealing the open tops of bundles, the combination of means for advancing a bundle with an open top in upright position, a pair of arms movable to force one wall of the top inwardly, a plate engaging the wall opposite to that folded inwardly, means for applying adhesive to the inner surface of said opposite wall while it is engaged by the plate, means for moving the plate to fold said opposite wall over and upon the infolded wall, the remaining walls being formed into flaps, a floating weight for pressing together the infolded walls, means for applying adhesive to surfaces on the flaps, and means for folding said flaps inwardly against the previously infolded walls.

22. In a machine for closing and sealing the tops of bundles, the combination of means operating to fold inward one wall of the bundle, a plate engageable by the wall opposite to that folded inwardly, means for applying adhesive to the inner surface of said opposite wall while it is engaged by the plate, and means for operating the plate after application of said adhesive to fold said opposite wall inwardly and upon the previously infolded wall.

23. In a machine for closing and sealing the open tops of bundles, the combination of means for advancing a bundle with an open top in upright position, a pair of members movable to force one wall of the top inwardly, a plate engaging the wall opposite to that so forced inwardly, means for applying adhesive to the inner surface of said opposite wall, means for swinging the plate to fold said opposite wall over and upon the infolded wall and to form the adjacent walls into flaps, means for applying adhesive to surfaces of the flaps, and means for folding said flaps inwardly against the previously infolded parts.

24. In a machine for closing and sealing the open tops of bundles of oblong horizontal cross-section, the combination of means for advancing a bundle with an open top in upright position and broadside foremost, means for folding inward and securing together the broad front and rear walls of the open top, one upon the other, and forming the side walls into flaps, said means including a plate engageable with one of said broad walls, means for applying adhesive to the inner surface of said wall after engagement thereof by said plate, and means for moving the plate to force the adhesively coated wall downwardly, means for applying adhesive to the flaps, and means for folding the flaps inward upon and securing them to the previously infolded portions of the top.

25. In a machine for closing and sealing the open tops of bundles, the combination of means for advancing a bundle with an open top in upright position, means for folding inwardly and securing together a pair of opposite walls of said top, one upon the other, and simultaneously forming the remaining opposite walls into flaps, a pressure member engaging and holding together said infolded portions of the top as the bundle advances, means for applying adhesive to surfaces of the flaps, and means for folding said coated flaps inwardly upon previously inturned portions of the top, said means including a pair of members engaging said flaps, mountings on which said members have a limited freedom of vertical movement, and springs acting on said members and tending to hold them at the lower limits of said vertical movement.

26. In a machine containing means for folding inwardly and adhesively securing together the walls at the top of a bundle and means engaging the top of a bundle to hold the infolded parts thereof together until the adhesive thereon has set, said folding and securing and said holding means being disposed in alignment, a unitary bed structure extending beneath the folding and securing means and the holding means, and means for adjusting the bed structure vertically.

27. In a machine for closing and sealing the open tops of bundles, the combination of a pair of arms, means for imparting simultaneous shifting and swinging movements to the arms, said swinging movement being controlled by cams and said arms operating to fold inward one wall of the open top of a bundle, a plate engaging the wall opposite to that folded inwardly by said arms, means for applying adhesive to the inner surface of said wall engaged by the plate, and means operable after application of the adhesive to move the plate to cause it to fold the wall engaged thereby inwardly over and upon the previously infolded wall.

28. In a machine for closing and sealing bundles, a pair of arms mounted for movement in opposite directions and operable on such movements in one direction to force inwardly one wall of the bundle and to force outwardly walls on either side of the first wall, a cam for each arm for determining the movement thereof, a cam follower carried by each arm and engaged with the cam associated with that arm, and means for swinging each arm about its cam follower as a pivot and moving the arm to cause the cam follower to advance and retreat along its cam.

29. In a machine for closing and sealing bundles, a pair of arms mounted on opposite sides of the bundle, a cam for each arm for determining the movement thereof, a cam follower carried by each arm and engaged with the cam associated with that arm, and means including a pair of rock shafts and pivoted elements actuated by the respective rock shafts and connected to respective arms for causing the arms to swing about their cam followers as pivots and to move the arms to cause their cam followers to advance and retreat along their associated cams.

30. In a machine for closing and sealing bundles, the combination of a pair of folding elements, means for reciprocating the elements in horizontal planes, a mounting for each element on which the element may be shifted bodily in an upward direction by the bundle, and spring means resisting the upward movements of the elements.

31. In a machine for closing and sealing bundles, the combination of a pair of folding elements reciprocable along horizontal paths at an angle to one another, means for reciprocating the elements, a mounting for each element on which the element may be shifted bodily in an upward direction by the bundle, and spring means resisting the upward movements of the elements.

WILLIAM L. IRVINE.